United States Patent [19]
Aker

[11] 3,834,585
[45] Sept. 10, 1974

[54] PLASTICS ACCUMULATOR HAVING FIRST-IN, FIRST-OUT ARRANGEMENT

[75] Inventor: James E. Aker, Seymour, Ind.
[73] Assignee: Standard Oil Company, Chicago, Ill.
[22] Filed: Apr. 17, 1972
[21] Appl. No.: 244,976

Related U.S. Application Data
[62] Division of Ser. No. 116,410, Feb. 18, 1971, Pat. No. 3,707,248.

[52] U.S. Cl..................... 222/1, 222/275, 222/385, 222/485, 222/487
[51] Int. Cl............................................. G07f 11/02
[58] Field of Search ........... 222/137, 481, 482, 485, 222/487, 275, 413, 378, 1, 379, 382, 383, 486; 141/102, 236; 425/244; 164/318; 417/510, 514, 349; 184/70

[56] References Cited
UNITED STATES PATENTS

| | | | |
|---|---|---|---|
| 2,106,620 | 1/1938 | Nilson | 222/378 X |
| 2,174,319 | 9/1939 | Gastraw | 222/413 UX |
| 2,597,175 | 5/1952 | Perkins | 222/137 |
| 2,616,130 | 11/1952 | Banz | 222/275 X |
| 2,857,082 | 10/1958 | Perkins | 222/485 X |
| 3,191,233 | 6/1965 | Linderoth | 222/413 UX |
| 3,491,827 | 1/1970 | Mace | 164/318 |

FOREIGN PATENTS OR APPLICATIONS

| | | | |
|---|---|---|---|
| 607,592 | 9/1948 | Great Britain | 222/383 |

*Primary Examiner*—Robert B. Reeves
*Assistant Examiner*—David A. Scherbel
*Attorney, Agent, or Firm*—Robert B. Stevenson; Arthur G. Gilkes; William T. McClain

[57] ABSTRACT

Heat degradation of plastics is minimized using an accumulator in which fresh plastic is introduced into the accumulator at a point remote from the point where previously stored plastic is withdrawn. Consequently, plastic which was last introduced into this accumulator is withdrawn before freshly introduced plastic. A control system for regulating the flow of plastic is also disclosed.

6 Claims, 7 Drawing Figures

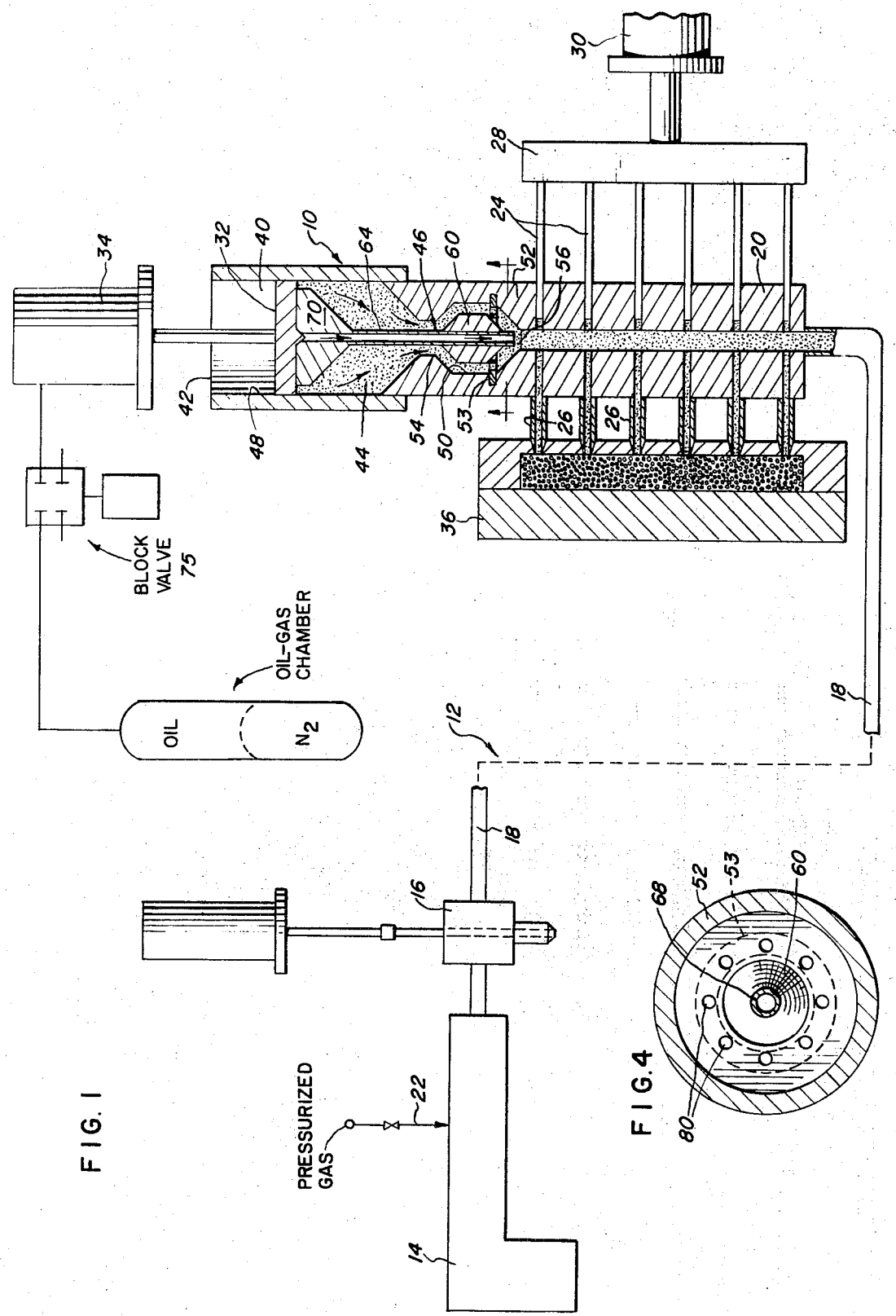

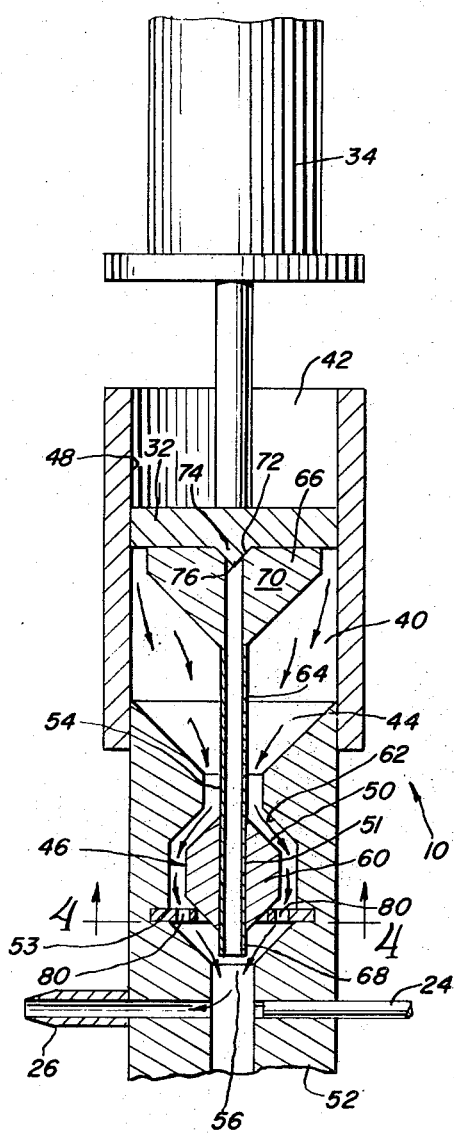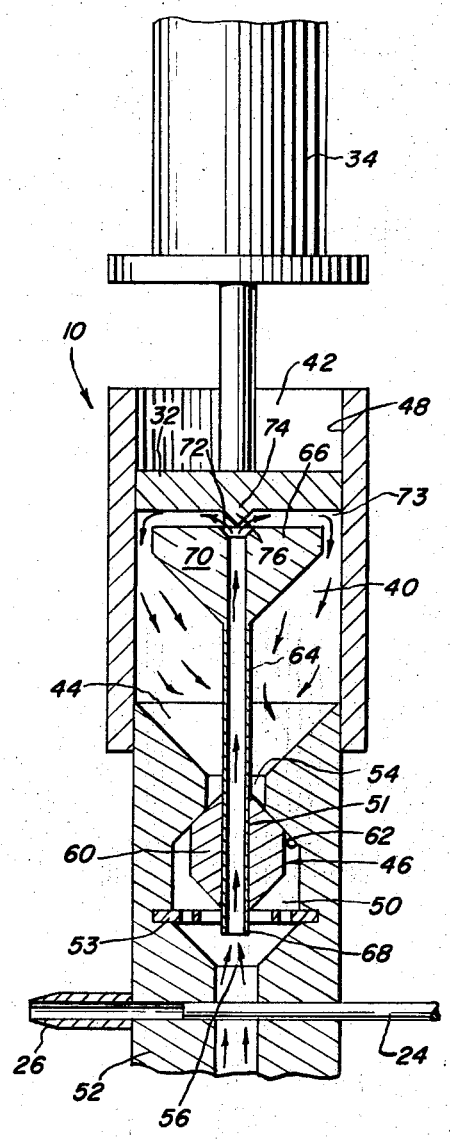

PLASTICS ACCUMULATOR HAVING FIRST-IN, FIRST-OUT ARRANGEMENT

CROSS-REFERENCES

This application is a divisional application of U.S. Ser. No. 116,410 entitled AN IMPROVED ACCUMULATOR USEFUL IN MOLDING ARTICLES OF MANUFACTURE FROM PLASTIC, filed Feb. 18, 1971 in the name of James E. Aker now U.S. Pat. No. 3,707,248.

BACKGROUND

In commercially available molding machines, extruded plastic flows through a fill line and manifold into an accumulator where it is stored before introduction into the mold. In typical accumulator/manifold designs, a residual quantity of plastic remains in the accumulator even though the bulk of pre-stored plastic has been introduced into the mold. When the accumulator is refilled, this residual plastic remains at the top of the accumulator. And even with repeated discharges and refills this residual plastic remains trapped in the accumulator and gradually heat-degrades. Degradation results, for example, in color changes, and the discolored plastic must be discarded. (Light-colored molded articles are very difficult to produce without discoloration). Another problem encountered with conventional accumulator designs is the waste of plastic in changing the color of the molded articles. Many multicolored articles which are unacceptable are produced before uniformity in color is attained. I have now invented an accumulator which alleviates these problems, and the drawings and accompanying description disclose the details thereof.

DESCRIPTION OF DRAWINGS

FIG. 1 is a schematic view of a molding machine including the improved accumulator of my design.

FIG. 2 is an enlarged, cross-sectional view of my accumulator showing the accumulator being filled.

FIG. 3 is an enlarged, cross-sectional view of my accumulator showing plastic being discharged from the accumulator.

FIG. 4 is a cross-sectional view taken along line 4—4 of FIG. 1.

PREFERRED EMBODIMENTS

Figure 6:
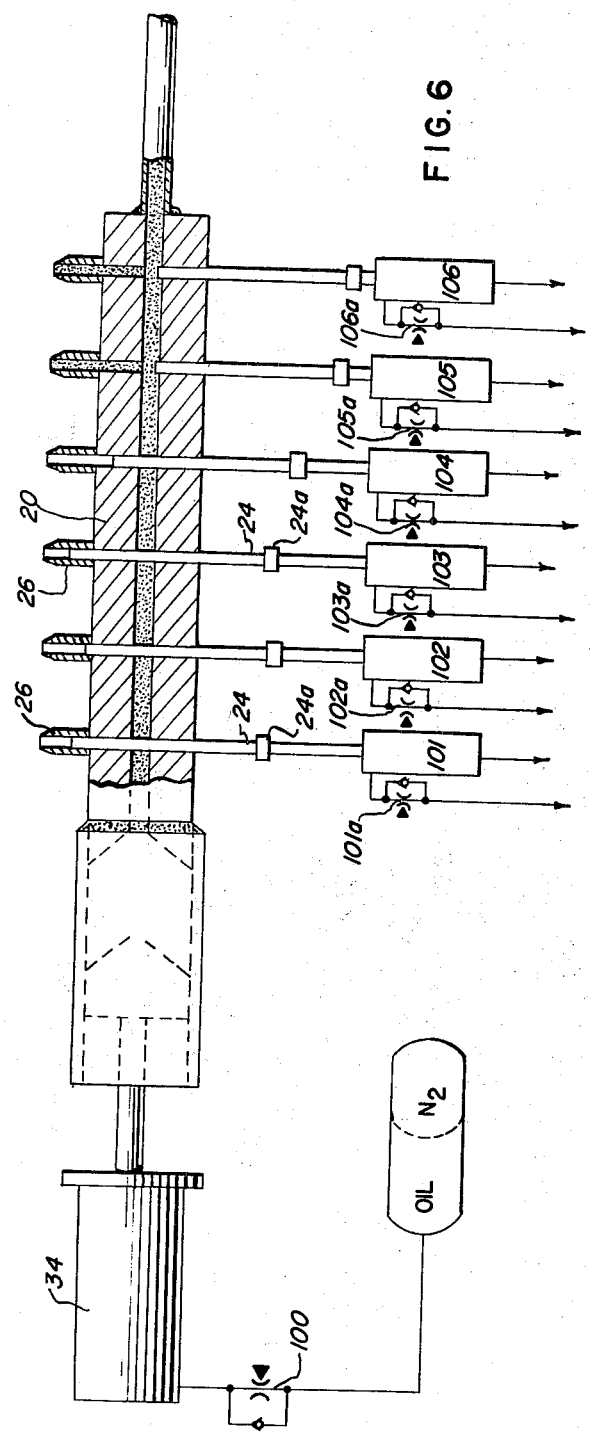
FIG. 6 shows an alternate embodiment of my invention wherein a novel control system is used to regulate the flow of plastic.

In accordance with my invention, accumulator 10 is designed so that periodically fresh plastic will flow through the accumulator, flushing out previously stored plastic. Since the plastic is flushed and not stored for excessive periods in accumulator 10, the plastic never has an opportunity to heat-degrade and the color of molded articles can be changed with fewer multicolored rejects. These are the principal advantages of my accumulator 10.

FIG. 1 shows my accumulator 10 mounted on injection molding machine 12. Hot plastic from extruder 14 flows through open safety valve 16 along conduit 18 through manifold 20 into accumulator 10. High pressure gas is introduced into extruder 14 at inlet 22 and is carried with the plastic into accumulator 10. When accumulator 10 has been filled with a "shot" of plastic, shut-off rods 24 are withdrawn from nozzles 26 in manifold 20. These rods 24 are connected to plate 28 which is moved to and fro by hydraulic cylinder 30. With the rods withdrawn from nozzles 26, as shown in FIG. 1, the "shot" from accumulator 10 is forced by piston 32 of a second hydraulic cylinder 34 through nozzles 26 and into mold 36. Simultaneously, the gas previously introduced into the hot plastic expands to provide a foamed article within mold 36. Introducing gas into the hot plastic is, however, an optional feature.

The chief components of my accumulator 10 are hollow, cylindrical chamber 40 having two open ends 42 and 44 and valve means 46. Piston 32 is seated in end 42 of chamber 40, is snug against the chamber's sidewall 48 and is free to move along the longitudinal axis of chamber 40 in response to oil pressure in hydraulic cylinder 34. End 44 of chamber 40 serves as an orifice and this end has connected to it manifold 20 which feeds hot, fluid plastic into chamber 40. There is in end 52 of manifold 20 an enlarged cavity 50 which is adjacent end 44 of chamber 40 and has within it and attached to its sidewall perforated annular member 53 (FIG. 4). Cavity 50 also has open ends 54 and 56, with valve means 46 moving between ends 54 and 56.

Valve means 46, as best shown in FIGS. 2 and 3, includes bulbous member 60 which is within enlarged cavity 50 and free to move to and fro in cavity 50. However, the bulbous member's movement is restricted at end 54 by cavity wall 62 and at end 56 by perforated annular member 53. Bulbous member 60 includes an opening 51 and extending therethrough is elongated tubular member 64 which serves as a passageway for fluid plastic. This tubular member 64 is free to move relative to member 60 and it has terminus 66 remote from the orifice of chamber end 44 and terminus 68 within cavity 50. At terminus 66 is head 70 having a female portion 72 which matches a male portion 74 of piston 32. Male portion 74 has an extended conical piece 76 which is adapted to fit into female portion 72 of tubular member 64.

FIG. 2 shows plastic flowing from extruder 14 into chamber 40. This plastic pushes against bulbous member 60, forcing this member to close off end 54 of cavity 50 by blocking the orifice leading into chamber 40. However, plastic will flow through tubular member 64, push against piston 32 and flow around head 70. The pressure in hydraulic cylinder 34 is less than that of the plastic, thus piston 32 will move away from female portion 72 providing gap 73 which permits the fluid plastic to flow into chamber 40. By filling chamber 40 at a point remote from the orifice of end 44, previously stored plastic is pushed toward the orifice and will be the first to leave accumulator 10 when the "shot" is introduced into mold 30.

FIG. 3 portrays the "shot" being introduced into mold 30. Hydraulic cylinder 34 is charged by opening block valve 75, forcing piston 32 to move toward the orifice of end 44. This brings conical piece 76 of piston 32 into mating relationship with female portion 72 of head 70 to force valve means 46 into engagement with perforated annular member 53. With valve means 46 in this position, bulbous member 60 is seated in the opening in annular member 53. The "shot" of plastic within accumulator 10 flows from chamber 40 around bulbous member 60 and out perforations 80 in annular member 53. Plastic within tubular member 64 also flows from terminus 68. Thus previously stored plastic will always leave chamber 40 before freshly introduced plastic. This minimizes the dwell time of the plastic within chamber 40 and reduces, dramatically, the possibility of heat degradation of the plastic and multicolored article rejects.

Figure 5B:
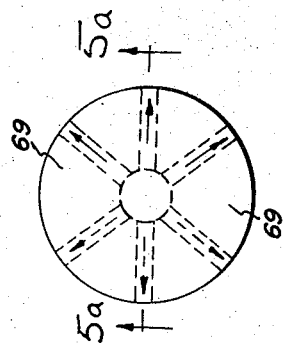
FIGS. 5(a) and 5(b) show, in partial view, an alternate embodiment of the accumulator.
Figure 5A:
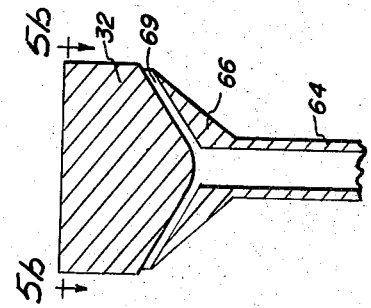

FIGS. 5(a) and 5(b) show a one-piece design wherein piston 32 is connected to terminus 66 of tubular member 64. In this design terminus 66 includes connector members 69 which are integral with piston 32. There are passageways between these connector members 69 which provide a spider-like channel arrangement permitting plastic to flow from tubular member 64 into chamber 40. Since this design does not close off flow as does the design illustrated in FIGS. 3 and 4, some back-flow occurs through member 64 when plastic is expulsed from accumulator 10. However, the cross-sectioned area for flow within member 64 is about 1/10 that provided by cavity 50, minimizing the back-flow.

FIG. 6 shows an alternate embodiment of my invention including a novel control system. Parts identical with those shown in FIGS. 1-4 are identified with the same numerals. The only significant difference between the apparatus shown in FIGS. 1-4 and that shown in FIG. 6 is the use of temperature-, pressure-compensated flow control valve 100 in place of block valve 75, and hydraulic cylinders 101-106 with associated temperature-, pressure-compensated flow control valves 101a-106a, respectively, in place of block 28 and hydraulic cylinder 30. Each rod 24 also has a stop 24a which limits the movement of the rod. Suitable temperature-, pressure-compensated flow control valves may be purchased from Vickers Industrial Hydraulics Division of Sperry-Rand (valve No. FCG-1500).

My novel control system provides flexible control for the feeding of plastic to mold 36 independent of the flow properties of the plastic or other characteristics of the plastic. Temperature-, pressure-compensated flow control valve 100 provides a controllable and reproducible oil flow rate to hydraulic cylinder 34. Consequently, accumulator 10 empties stored plastic at a rate independent of the plastic flow properties. Since hydraulic cylinders 101–Ωcan independently move rods 24 relative to each other, controlled flow of the plastic into mold 36 is possible. By placing temperature-, pressure-compensated flow control valves 101a–106a in the oil line to hydraulic cylinders 101–106, a controllable and reproducible rate of shut-off rod withdrawal and insertion into nozzles 26 is possible. By adjusting the oil flow rates to cylinders 101–106, plastic flow through any given nozzle can be adjusted to occur over a given portion of the accumulator stroking period.

The prior art system typically includes a flow control valve machined into the manifold upstream of each nozzle, providing a variable restriction. Flow through such valves has been found to be significantly affected by lot to lot changes in the plastic, temperature fluctuation within the manifold/nozzle system, and variations of the extruder feed. Such valves also introduce dead areas and are difficult to adjust and subject to fouling. My flow control system eliminates dead areas and allows greater flexibility of plastic flow. Moreover, the temperature-, pressure-compensated flow control valves used in my system may be mounted in a readily accessible location regardless of the design of the apparatus.

I claim:

1. In an apparatus wherein hot, fluid plastic is introduced into, stored in and periodically withdrawn from an accumulator through the same orifice, internal means for introducing fresh plastic into the accumulator at a point remote from the point where stored plastic is withdrawn so that plastic which was first introduced into the accumulator is withdrawn before the freshly introduced plastic.

2. In a process wherein hot, fluid plastic is introduced into, stored in and periodically withdrawn from an accumulator through the same orifice, the step of introducing fresh plastic into the accumulator at a point remote from the point where stored plastic is withdrawn so that plastic which was first introduced into the accumulator is withdrawn before the freshly introduced plastic.

3. In combination, supply means for plastic, accumulator means for receiving and storing plastic from said supply means, manifold means connecting the supply means and the accumulator means, said manifold means including a plurality of nozzles, shut-off rod means for the nozzles movable between positions which permit in one position and prevent in another position flow of plastic through said nozzles, and conduit means through the manifold placing the supply means and accumulator means in communication with each other, and control means including cylinder means connected to each of said shut-off rod means and temperature-, pressure-compensated flow control valve means for each of said cylinders which control the flow of pressurizing fluid to said cylinders.

4. The combination of claim 3 wherein the accumulator means includes cylinder means and temperature-, pressure-compensated flow control valve means for said accumulator cylinder means which controls the flow of pressurizing fluid to said cylinder means.

5. The combination of claim 4 wherein the accumulator means includes a chamber including an orifice in communication with said manifold means through which plastic may flow and a valve means at said orifice which, in response to plastic being forced from the chamber, moves to a first position permitting plastic to flow from the chamber through the orifice and, in response to fluid attempting to enter the chamber through orifice, moves to a second position preventing fluid from flowing directly into the chamber through said orifice, said valve means characterized in that it includes an elongated passageway into the chamber having a terminous remote from said orifice, said passageway permitting plastic to enter the chamber at a point remote from said orifice when the valve means is in the second position.

6. The combination of claim 4 wherein the accumulator means adapted to store fluid plastic or the like comprises: a hollow, cylindrical chamber having first and second ends and an inner sidewall; a piston at the chamber's first and seated in the chamber so that it is snug against the chamber's inner sidewall, said piston being movable along the longitudinal axis of the chamber in both forward and reverse directions; means coupled to the chamber's second end and in communication with said plastic or the like, said communicating means having therein, adjacent chamber's second end, an enlarged cavity which has first and second open ends and a perforated stop member at the cavity's second end, and a valve at the chamber's second end including a. a bulbous member within the cavity, but smaller than said cavity so that said bulbous member is free to move within the cavity in response to flowing plastic, said bulbous member, as the plastic flows toward the chamber, moving to a position blocking the cavity's first end and preventing plastic from flowing directly into the chamber and, as plastic flows from the chamber, moving toward the cavity's second end and engaging said stop member, and b. an elongated tubular member extending through said bulbous member, said tubular member having a first terminus near the chamber's first end and a second terminus near the cavity's second end, said tubular member allowing plastic to flow therethrough either into or from the chamber regardless of the position of the bulbous member.

* * * * *